United States Patent [19]

Kasahara et al.

[11] Patent Number: 4,946,898

[45] Date of Patent: Aug. 7, 1990

[54] PROPYLENE POLYMER COMPOSITION

[75] Inventors: Toshikazu Kasahara; Hideo Funabashi, both of Ichihara, Japan

[73] Assignee: Idemitsu Petrochemical Co., Ltd., Tokyo, Japan

[21] Appl. No.: 265,034

[22] Filed: Oct. 31, 1988

[30] Foreign Application Priority Data

Nov. 11, 1987 [JP] Japan .................. 62-282995

[51] Int. Cl.$^5$ .................. C08L 23/10; C08L 23/16; C08F 297/08
[52] U.S. Cl. .................. 525/240; 525/322; 525/323
[58] Field of Search .................. 525/240, 322, 323

[56] References Cited

U.S. PATENT DOCUMENTS

| | | | |
|---|---|---|---|
| 3,301,921 | 1/1967 | Short | 524/570 |
| 4,211,690 | 7/1980 | Asano et al. | 525/88 |
| 4,339,557 | 7/1982 | Hasuo et al. | 525/323 |
| 4,365,045 | 12/1982 | Schneider et al. | 525/323 |
| 4,547,552 | 10/1985 | Toyota et al. | 525/322 |
| 4,550,145 | 10/1985 | Kasahara et al. | 525/267 |

FOREIGN PATENT DOCUMENTS

| | | |
|---|---|---|
| 0045975 | 2/1982 | European Pat. Off. . |
| 0094818 | 11/1983 | European Pat. Off. . |
| 47-8207 | 3/1972 | Japan . |
| 49-13231 | 3/1974 | Japan . |
| 49-13514 | 4/1974 | Japan . |
| 50-115296 | 9/1975 | Japan . |
| 52-4588 | 1/1977 | Japan . |
| 54-152095 | 11/1979 | Japan . |
| 55-764 | 1/1980 | Japan . |
| 55-8011 | 3/1980 | Japan . |
| 57-63310 | 4/1982 | Japan . |
| 63-146905 | 6/1988 | Japan . |
| 1038993 | 8/1966 | United Kingdom . |

OTHER PUBLICATIONS

*Partial translation.
Macromolecule, vol. 6, No. 6, (1973), pp. 925–926.
Macromolecule, vol. 8, No. 6, (1975), pp. 687–689.

*Primary Examiner*—Carman J. Seccuro
*Attorney, Agent, or Firm*—Frishauf, Holtz, Goodman & Woodward

[57] ABSTRACT

The present invention relates to a propylene polymer composition comprising:

60 to 94% by weight of a propylene homopolymer having (a) an intrinsic viscosity ($[\eta_1]$) of 0.5 to 5 dl/g, (b) a xylene soluble content at ordinary temperature (Xs) of not more than 3% by weight, and a difference ($\Delta[\eta_1]$) between ($[\eta_1]$) of xylene insoluble portion at the ordinary temperature and ($[\eta_1]$) of xylene soluble portion at the ordinary temperature of not more than 0.5 dl/g, (c) an isotactic pentad fraction (IP) falling within the range represented by the following equation:

$$IP \geq -0.624[\eta_1] + 97.5,$$

and (d) a crystallization temperature (Tc) falling within the range represented by the following equation:

$$Tc \geq -2.33[\eta_1] + 116.0; \text{ and}$$

6 to 40% by weight of a propylene-ethylene random copolymer having (e) an intrinsic viscosity ($[\eta_2]$) of not less than 2.8 dl/g and (f) an ethylene content of 30 to 80% by weight.

Moldings obtained from the composition of the present invention are high in both impact resistance and stiffness, and can find various applications as moldings well balanced in physical properties.

13 Claims, No Drawings

PROPYLENE POLYMER COMPOSITION

BACKGROUND OF THE INVENTION

The present invention relates to a novel propylene polymer composition useful for production of moldings.

Crystalline polypropylene is a useful resin as a general-purpose resin because of its high stiffness, hardness, tensile strength, and heat resistance.

Crystalline polypropylene, however, is not sufficiently high in impact resistance and has a diadvantage of being poor in physical properties at low temperatures.

In general, stiffness, hardness and heat resistance of plastic material are in an antinomic relation with impact resistance thereof, and it is quite difficult to design so that all the stiffness, hardness, heat resistance and impact resistance are sufficiently satisfactory.

In order to extend applications of propylene polymers, however, it is necessary to improve both impact resistance and stiffness.

Such improved propylene polymers can be used in place of an ABS resin well balanced in impact resistance and stiffness.

Under such circumstances, to improve impact resistance of propylene polymers, several proposals have been made. For example, a method in which an elastomer exemplified by an ethylene-propylene rubber (EPR) is compounded to polypropylene has been proposed.

In this method, however, the elastomer is dispersed insufficiently as compared with a composition which is produced by two-stage polymerization and compounded in the second stage reactor, and thus can provide only moldings which are decreased in weld strength, luster and further in stiffness. Furthermore, compounding of EPR increases the cost of a polypropylene composition.

A method of preparing propylene-ethylene random copolymers by copolymerizing propylene with other α-olefin, e.g., ethylene has been known for the same purpose above.

Further, a method of preparing a propylene polymer composition comprising two or more components obtained by multi-stage polymerization has been known for the same purpose as above.

Random copolymers obtained by the conventional methods, however, are improved insufficiently in low temperature impact resistance as compared with homopolypropylene. If the ethylene content is increased, stiffness, strength, heat resistance, etc. are abruptly decreased.

In conventional copolymer compositions obtained by the multi-stage polymerization method, the low temperature impact resistance value is greatly increased as compared with polypropylene. However, stiffness, hardness and heat resistance are decreased.

A number of proposals have been made to overcome the above problems of the multi-stage copolymerization method. For example, Japanese Patent Application Laid-Open Nos. 115296/1975 and 4588/1977 disclose a method in which block copolymerization of ethylene and propylene is carried out at multi-stages. Japanese Patent Publication Nos. 8207/1972, 13231/1974, and 13514/1974 disclose an improved method in which a third component is added to the catalyst. Japanese Patent Application Laid-Open Nos. 764/1980, 152095/1979, and Japanese Patent Publication No. 8011/1980 disclose an improved method in which a specified catalyst is used.

The above methods are intended to minimize the reduction of stiffness as compared with a polypropylene homopolymer. However, the value of stiffness equal to or more than that of the homopolymer has not been obtained.

An object of the present invention is to provide a propylene copolymer composition which is suitable for molding of high impact resistant and high stiffness moldings.

In view of the above circumstances of conventional techniques, the present inventors made investigations to develop a propylene polymer composition which permits production of moldings having high impact resistance and high stiffness without addition of specific additives. As a result, it has been found that high stiffness moldings can be obtained only by using a propylene polymer composition containing a specified propylene homopolymer component and a specified ethylene-propylene random copolymer as described hereinafter in a specified ratio. Based on the findings, the present invention has been accomplished.

The present invention relates to a propylene polymer composition comprising:
60 to 94% by weight of a propylene homopolymer having:
  (a) an intrinsic viscosity, $[\eta_1]$, of 0.5 to 5 dl/g;
  (b) a xylene soluble content at the ordinary temperature, Xs, of not more than 3% by weight, and a difference ($\Delta[\eta_1]$) between an intrinsic viscosity ($[\eta_1]$) of a xylene insoluble portion (at the ordinary temperature) and an intrinsic viscosity ($[\eta_1]$) of a xylene soluble portion, i.e., $\Delta[\eta_1]$ = intrinsic viscosity ($[\eta_1]$) of insoluble portion—intrinsic viscosity ($[\eta_1]$) of soluble portion of not more than 0.5 dl/g;
  (c) an isotactic pentad fraction, IP, falling within the range represented by the equation:

$$IP \geq -0.624[\eta_1] + 97.5;$$

and
  (d) a crystallization temperature (Tc) falling within the range represented by the following equation:

$$Tc \geq -2.33[\eta_1] + 116.0;$$

and
6 to 40% by weight of a propylene-ethylene random copolymer having:
  (e) an intrinsic viscosity, $[\eta_2]$, of not less than 2.8 dl/g; and
  (f) an ethylene content of 30 to 80% by weight.

DETAILED DESCRIPTION OF THE INVENTION

The propylene homopolymer to be used as the first component of the composition of the present invention is a propylene homopolymer characterized by the following requirements (a) to (d).

(a) The intrinsic viscosity, $[\eta_1]$, of the propylene homopolymer is 0.5 to 5 dl/g, preferably 1 to 4 dl/g, and more preferably 1.1 to 3.0 dl/g. If the intrinsic viscosity is more than 5 dl/g, fluidity at the time of melting is low. On the other hand, if it is less than 0.5 dl/g, the strength of the molding is decreased.

(b) The xylene soluble content at the ordinary temperature (Xs) of the propylene homopolymer is not more than 3% by weight, preferably 2 to 0.1% by weight, and more preferably 1.5 to 0.2% by weight.

The xylene soluble content at ordinary temperature as used herein is a value as measured by the following method: (i) 5±0.5 g of a sample is completely dissolved in 700 ml of p-xylene, (ii) the resulting solution is cooled to ordinary temperature, (iii) the solution is filtered, and methanol is added to the separated solution to precipitate, (iv) the filtration is again performed, and (v) the solids portion is dried at 100° C. for 4 hours and weighed.

If the xylene solution content at ordinary temperature of the propylene homopolymer is more than 3% by weight, all stiffness, heat resistance and hardness drop.

In the propylene homopolymer of the present invention, $\Delta[\eta_1]$ (=intrinsic viscosity $[\eta]$ of xylene insoluble (ordinary temperature) portion—intrinsic viscosity $[\eta_1]$ of xylene soluble (ordinary temperature) portion) is not more than 0.5 dl/g, preferably 0.4 to 0.1 dl/g. If $\Delta[\eta_1]$ is more than 0.5 dl/g, both stiffness and heat resistance of the composition of the present invention are decreased.

The above intrinsic viscosity is measured in a tetralin solution at a temperature of 135° C.

(c) The isotactic pentad fraction (IP) of the propylene homopolymer of the present invention is in the range represented by the equation:

$$IP \geqq -0.624[\eta_1] + 97.5,$$

specifically $$IP \geqq -0.624[\eta_1] + 98.0,$$

If the isotactic pentad fraction is outside the above specified range, stiffness and heat resistance are decreased.

The isotactic pentad fraction as used herein means an isotactic fraction in the pentad unit as contained in the polypropylene chain as measured by the method disclosed in Macromolecules, 6, 925 (1973) by A. Zambelli et al, i.e., the method using $^{13}$C-NMR. In other words, the isotactic pentad fraction is a fraction of propylene monomer units existing in the center of the chain in which five propylene monomer units are continuously linked together in the meso bond. Assignment of peaks was made by the method described in Macromolecules, 8, 687 (1975).

More specifically, the isotactic pentad unit is measured as an intensity fraction of mmmm peak in all absorption peaks in the methyl carbon region of $^{13}$C-NMR spectrum.

The value of the isotactic pentad fraction in the propylene homopolymer of the present invention is a value of the crystalline polypropylene obtained itself, but not that of the polymer after extraction, fractionation and so forth.

(d) The crystallization temperature Tc of the propylene homopolymer is within the range represented by the equation:

$$Tc \geqq -2.33[\eta_1] + 116.0,$$

specifically $$Tc \geqq -2.33[\eta_1] + 117.0,$$

In the present invention, the crystallization temperature Tc was measured by the following method. That is, 8 mg of a sample was raised in temperature from 50° C. to 220° C. at a temperature raising speed of 320° C./min by the use of a differential scanning calorimeter and then maintained at that temperature for 10 minutes, and lowered in temperature to 50° C. at a temperature lowering speed of 10° C./min.

In production of the propylene homopolymer as the first component for the composition of the present invention, it is desirable to use a stereoregularity polymerization catalyst, particularly a catalyst having a large stereoregularity tendency.

As such catalysts, for example, a catalyst containing (i) a reaction product of a magnesium compound and a titanium compound, (ii) an organometallic compound, and (iii) an electron donating compound as a component can be used.

As the reaction product of a magnesium compound and a titanium compound (i), a product obtained by contacting magnesium dialkoxide represented by the general formula: $Mg(OR^1)_2$ (wherein $R^1$ is an alkyl group having 1 to 20 carbon atoms) with an electron donating compound and if necessary, further with a halogenation agent, and then reacting with a halogen-containing titanium compound represented by the general formula: $Ti(OR^2)_nX^1_{4-n}$ (wherein n is 0 to less than 4, $X^1$ is a halogen atom, and $R^2$ is an alkyl group having 1 to 20 carbon atoms) is preferably used.

As the organometallic compound (ii), organometallic compounds of aluminum, lithium, zinc and the like can be used. In particular, as the organoaluminum compound, an alkylaluminum compound represented by the general formula: $AlR^3_mX^2_{3-m}$ (wherein $R^3$ is an alkyl group having 1 to 20 carbon atoms, $X^2$ is a halogen atom, and m is 0 to not more than 3) is preferably used.

As the electron donating compound (iii), organic compounds containing oxygen, nitrogen, phosphorus, sulfur or the like are usually used.

More specifically, esters such as aromatic carboxylic acid esters, oxygen-containing silicon compounds such as diphenyldialkoxysilane, amines, amides, ketones, nitriles, phosphines, phosphoramides, esters, thioethers, thioesters, acid anhydrides, acid halides, organic acids and the like can be used.

In preparation of the reaction product of a magnesium compound and a titanium compound (i), magnesium dialkoxide and if necessary 0.01 to 10 mol of a halogenation agent are added, and an electron donating compound is added in an amount of 0.01 to 10 mol per mol of magnesium and a halogen-containing titanium compound is added in an amount of 1 to 50 mol per mol of magnesium, and they are reacted at a temperature of 0° to 200° C. for a time of 5 minutes to 10 hours. In this case, the reaction is preferably carried out repeatedly twice or more times. The electron donating compound is chosen from the compounds listed as the electron donating compound (iii).

In preparation of the catalyst, if necessary, an inert solvent, e.g., hydrocarbons, can be used.

By polymerizing propylene by the use of the magnesium compound/titanium compound reaction product (i) (solid component) which has been treated with the organometallic compound (ii) and the electron donating compound (iii) under suitable conditions, a high stereoregularity propylene homopolymer can be obtained.

In this case, as the propylene starting material, high purity propylene is preferably used to obtain the propylene homopolymer of the present invention.

Polymerization method and polymerization conditions are not critical. Polymerization can be carried out, continuously or batchwise, by solution polymerization, suspension polymerization, gas phase polymerization and so forth.

In the case of the solution polymerization, the catalyst is used in such an amount that the concentration of the above solid component (calculated as a titanium atom) is from 0.001 to 1 mmol/l.

The organometallic compound (ii) to be used as a catalyst component for production of the propylene homopolymer to be used in the present invention can be used in the range of 1 to 1,000 mol per mol of a titanium atom.

The electron donating compound to be used as the component (iii) of the catalyst (which is added at the time of polymerization) can be used in an amount of 0.01 to 200 mol per mol of a titanium atom.

In connection with polymerization conditions, the polymerization can be carried out at a pressure of from atmospheric pressure to 50 kg/cm$^2$ and a temperature of from 30° to 200° C.

Controlling the molecular weight can be carried out by known techniques utilizing hydrogen or a catalyst composition.

The propylene homopolymer to be used in the composition of the present invention can be produced by a method as described above, that is, a known propylene polymerization method using a high stereoregularity catalyst, e.g., a method as described in, for example, Japanese Patent Application Laid-Open Nos. 63310/1982 and 146905/1988, more specifically by applying gas polymerization and so forth under conditions which have been determined taking into consideration the characteristics required for the polymer of the present invention (requirements (a) to (d)).

The propylene polymer composition of the present invention comprises a composition containing the propylene homopolymer as obtained above and a propylene-ethylene random copolymer as the second component.

For the propylene-ethylene random copolymer to be used as the second component of the present invention is required to have an intrinsic viscosity of at least 2.8 dl/g, preferably 3.0 to 10 dl/g, more preferably 3 to 7 dl/g, and an ethylene content of 30 to 80% by weight, preferably 35 to 70% by weight, more preferably 40 to 65% by weight. If the intrinsic viscosity is less than 2.8 dl/g, impact resistance is not sufficiently high. If the ethylene content is outside the above specified range, impact resistance is not sufficiently high.

The propylene-ethylene random copolymer to be used as the second component in the present invention can be produced by copolymerizing propylene and ethylene by the use of the similar catalyst as the stereoregularity polymerization catalyst used in production of the propylene homopolymer as the first component under the similar polymerization conditions as in production of the propylene homopolymer as the first component.

The propylene polymer composition to be used in the composition of the present invention can be obtained by compounding the first and second components previously prepared, in a predetermined ratio, and can be efficiently produced, for example, by blending in a polymerization vessel by the two stage polymerization method.

In the first place, in the first stage polymerization vessel, the propylene homopolymer as the first component is produced by the above method. Then, in the second stage polymerization vessel, ethylene and propylene are copolymerized in the presence of the propylene homopolymer obtained at the first stage in such a manner that the intrinsic viscosity is within the above specified range, and the propylene homopolymer at the first stage (the first component) constitutes 60 to 94% by weight, preferably 65 to 90% by weight of the total polymer and the propylene-ethylene random copolymer at the second stage (the second component) constitutes 6 to 40% by weight, preferably 10 to 35% by weight of the total polymer.

The composition thus obtained can be used as a molding material by compounding various additives such as an antioxidant by the usual method and then pelletizing.

Moldings obtained from the propylene polymer composition of the present invention are high in both impact resistance and stiffness, and can find various applications as moldings well balanced in physical properties.

The present invention is described in greater detail with reference to the following examples.

EXAMPLE 1

(1) Preparation of Solid Catalyst Component

In a 4-liter glass container the atmosphere of which had been replaced with argon, 40 g of diethoxymagnesium, 600 ml of n-heptane and 40 mmol of di-n-butyl phthalate were placed, and they were then stirred at room temperature for 30 minutes. Then, 90 mmol of silicon tetrachloride was added to the solution as obtained above and stirred for one hour, and then 10 mol of titanium tetrachloride was added and stirred at 110° C. for 2 hours.

The supernatant liquid was separated. After washing with hot n-heptane, 10 mol of titanium tetrachloride was added and stirred at 110° C. for 2 hours. By thoroughly washing with n-heptane, a solid catalyst component was obtained.

The catalyst contained 2.4% by weight of Ti.

(2) Polymerization

In a 5-liter autoclave, after thoroughly replacing the atmosphere with nitrogen gas, 20 g of polypropylene which had been dried was placed. Then, 2.0 mmol of triethylaluminum, 0.1 mmol of diphenyldimethoxysilane and 0.01 mg (as titanium atom) of the above solid catalyst component were placed in the autoclave. Hydrogen and propylene were introduced, and the temperature and the pressure were increased to 70° C. and 28 kg/cm$^2$, respectively. Under these conditions, polymerization was carried out for two hours.

After the polymerization at the first stage was completed, degassing was once conducted. Then, a mixed gas of ethylene and propylene, and hydrogen were introduced. While maintaining the pressure at a mixed gas pressure of 18 kg/cm$^2$, the second stage polymerization was carried out at 55° C. for two hours.

After the completion of the second stage polymerization, unreacted gases were removed to obtain a propylene polymer composition shown in Table 1. To the propylene polymer thus obtained, conventionally known additives were added and mixed, and the resulting mixture was pelletized by the use of an extruder.

EXAMPLES 2 TO 4, AND COMPARATIVE EXAMPLES 1 TO 3

In Example 1, conditions for the first stage polymerization and/or conditions for the second stage polymerization were changed to obtain propylene polymer compositions shown in Table 1.

Moldings of the above compositions were measured for luster, impact strength and stiffness (modulus in flexture). The results are shown in Table 1.

TABLE 1

|  | Example | | | | Comparative Example | | |
| --- | --- | --- | --- | --- | --- | --- | --- |
|  | 1 | 2 | 3 | 4 | 1 | 2 | 3 |
| Propylene Homopolymer $[\eta_1]$ (dl/g) | 1.1 | 1.2 | 1.4 | 2.5 | 1.0 | 1.4 | 1.3 |
| Xylene Soluble Content at Ordinary Temperature (wt %) | 1.3 | 1.1 | 1.0 | 0.5 | 1.3 | 1.0 | 1.1 |
| $\Delta[\eta_1]$ | 0.3 | 0.3 | 0.2 | 0.3 | 0.3 | 0.2 | 0.3 |
| IP | 97.5 | 07.3 | 07.1 | 96.6 | 97.8 | 97.1 | 97.3 |
| $-0.624[\eta_1] + 97.5$ | 96.8 | 96.8 | 96.6 | 96.0 | 96.9 | 96.6 | 96.7 |
| Tc | 118.3 | 117.6 | 115.8 | 111.7 | 119.0 | 115.8 | 116.3 |
| $-2.33[\eta_1] + 116.0$ | 113.4 | 113.2 | 112.7 | 110.2 | 113.7 | 112.7 | 113.0 |
| Amount of Polymer (wt %) | 82 | 67 | 88 | 82 | 49 | 82 | 84 |
| Propylene-Ethylene Random Copolymer $[\eta_2]$ (dl/g) | 3.8 | 4.1 | 6.7 | 3.0 | 3.9 | 1.9 | 4.3 |
| Ethylene Content (wt %) | 41 | 64 | 32 | 56 | 36 | 47 | 17 |
| Amount of Polymer (wt %) | 18 | 33 | 12 | 18 | 47 | 18 | 16 |
| Modulus in Flexture*[1] (kg/cm$^2$) | 17300 | 12000 | 16000 | 15100 | 8200 | 13100 | 13700 |
| Izod Impact Strength*[2] ($-20°$ C.) (kg · cm/cm) | 3.1 | 8.0 | 3.5 | 4.2 | 20.4 | 2.3 | 2.1 |

*[1]Modulus in Flexture: Measured according to JIS K7203
*[2]Izod Impact Strength: Measured according to JIS K7110 (notched)

What is claimed is:

1. A propylene polymer composition comprising:
60 to 94% by weight of a propylene homopolymer having (a) an intrinsic viscosity ($[\eta_1]$) of 0.5 to 5 dl/g, (b) a xylene soluble content at ordinary temperature (Xs) of not more than 3% by weight, and a difference ($\Delta[\eta_1]$) between an intrinsic viscosity ($[\eta_1]$) of xylene insoluble portion at the ordinary temperature and an intrinsic viscosity ($[\eta_1]$) of xylene soluble portion at the ordinary temperature of not more than 0.5 dl/g, (c) an isotactic pentad fraction (IP) falling within the range represented by the following equation:

$$IP \geq -0.624[\eta_1] + 97.5,$$

and (d) a crystallization temperature (Tc) falling within the range represented by the following equation:

$$Tc \geq -2.33[\eta_1] + 116.0;\text{ and}$$

6 to 40% by weight of a propylene-ethylene random copolymer having (e) an intrinsic viscosity ($[\eta_2]$) of not less than 2.8 dl/g and (f) an ethylene content of 30 to 80% by weight.

2. The composition as claimed in claim 1, wherein the intrinsic viscosity $[\eta_1]$ of the propylene homopolymer is 1 to 4 dl/g.

3. The composition as claimed in claim 1, wherein the xylene soluble content at the ordinary temperature (Xs) of the propylene homopolymer is 2 to 0.1% by weight.

4. The composition as claimed in claim 1, wherein the difference ($66[\eta_1]$) between the intrinsic viscosity ($[\eta_1]$) of xylene insoluble portion at the ordinary temperature and the intrinsic viscosity ($[\eta_1]$) of xylene soluble portion at the ordinary temperature is 0.4 to 0.1 dl/g.

5. The composition as claimed in claim 1, wherein the isotactic pentad fraction (IP) is in the range represented by the following equation:

$$IP \geq -0.624[\eta_1] + 98.0.$$

6. The composition as claimed in claim 1, wherein the crystallization temperature (Tc) is in the range represented by the following equation:

$$Tc \geq -2.33[\eta_1] + 117.0.$$

7. The composition as claimed in claim 1, wherein the intrinsic viscosity ($[\eta_2]$) of the propylene-ethylene random copolymer is 3.0 to 10 dl/g.

8. The composition as claimed in claim 1, wherein the ethylene content of the propylene-ethylene copolymer is 35 to 70% by weight.

9. The composition as claimed in claim 1, wherein the intrinsic viscosity $[\eta_1]$ of the propylene homopolymer is 1 to 4 dl/g and the xylene soluble content at the ordinary temperature (Xs) of the propylene homopolymer is 2 to 0.1% by weight.

10. The composition as claimed in claim 9, wherein the difference between the intrinsic viscosity of xylene insoluble portion at the ordinary temperature and the intrinsic viscosity of xylene soluble portion at the ordinary temperature is 0.4 to 0.1 dl/g.

11. The composition as claimed in claim 10, wherein the isotactic pentad fraction (IP) is in the range represented by the following equation:

$$IP \geq -0.624[\eta_1] + 98.0 \text{ and}$$

the crystallization temperature (Tc) is in the range represented by the following equation:

$$Tc \geq -2.33[\eta_1] + 117.0.$$

12. The composition as claimed in claim 11, wherein the intrinsic viscosity of the propylene-ethylene random copolymer is 3.0 to 10 dl/g.

13. The composition as claimed in claim 12, wherein the ethylene content of the propylene-ethylene copolymer is 35 to 70% by weight.

* * * * *